Dec. 29, 1925.

L. R. EASTMAN 1,567,639

CAPSULE FILLING MACHINE

Filed July 10, 1922     5 Sheets-Sheet 1

Inventor
Louis Ralph Eastman

Dec. 29, 1925.

L. R. EASTMAN 1,567,639

CAPSULE FILLING MACHINE

Filed July 10, 1922     5 Sheets-Sheet 2

Inventor
LOUIS RALPH EASTMAN

Attorneys.

Dec. 29, 1925.
L. R. EASTMAN
1,567,639
CAPSULE FILLING MACHINE
Filed July 10, 1922      5 Sheets-Sheet 3
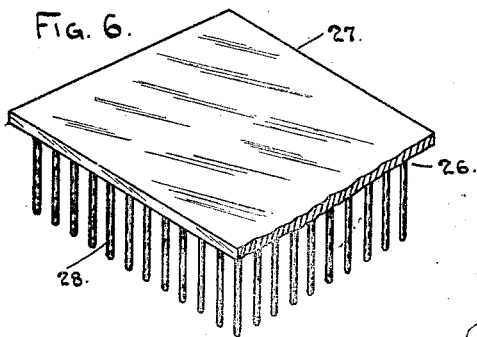
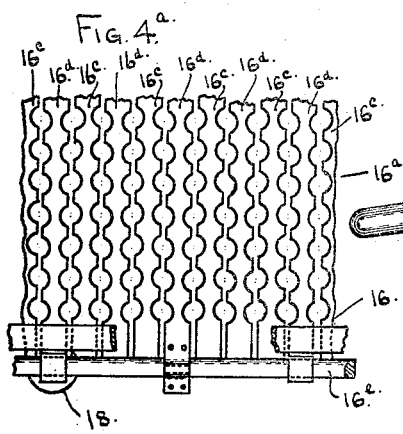
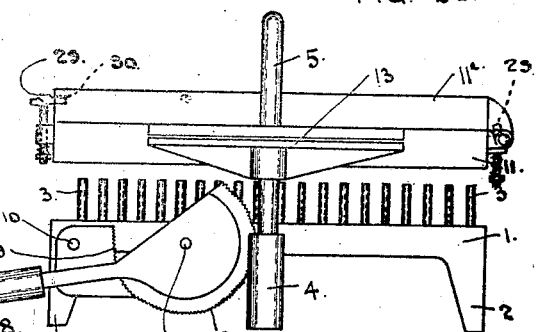
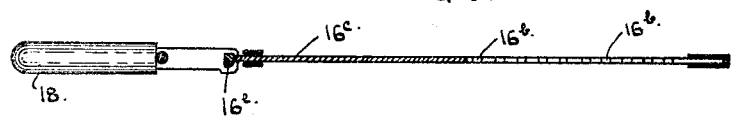
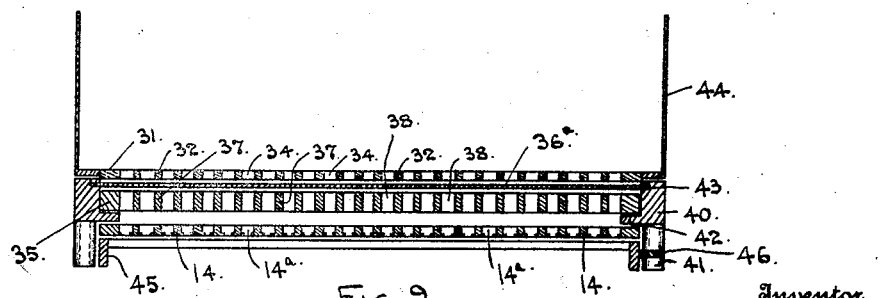
Inventor
LOUIS RALPH EASTMAN

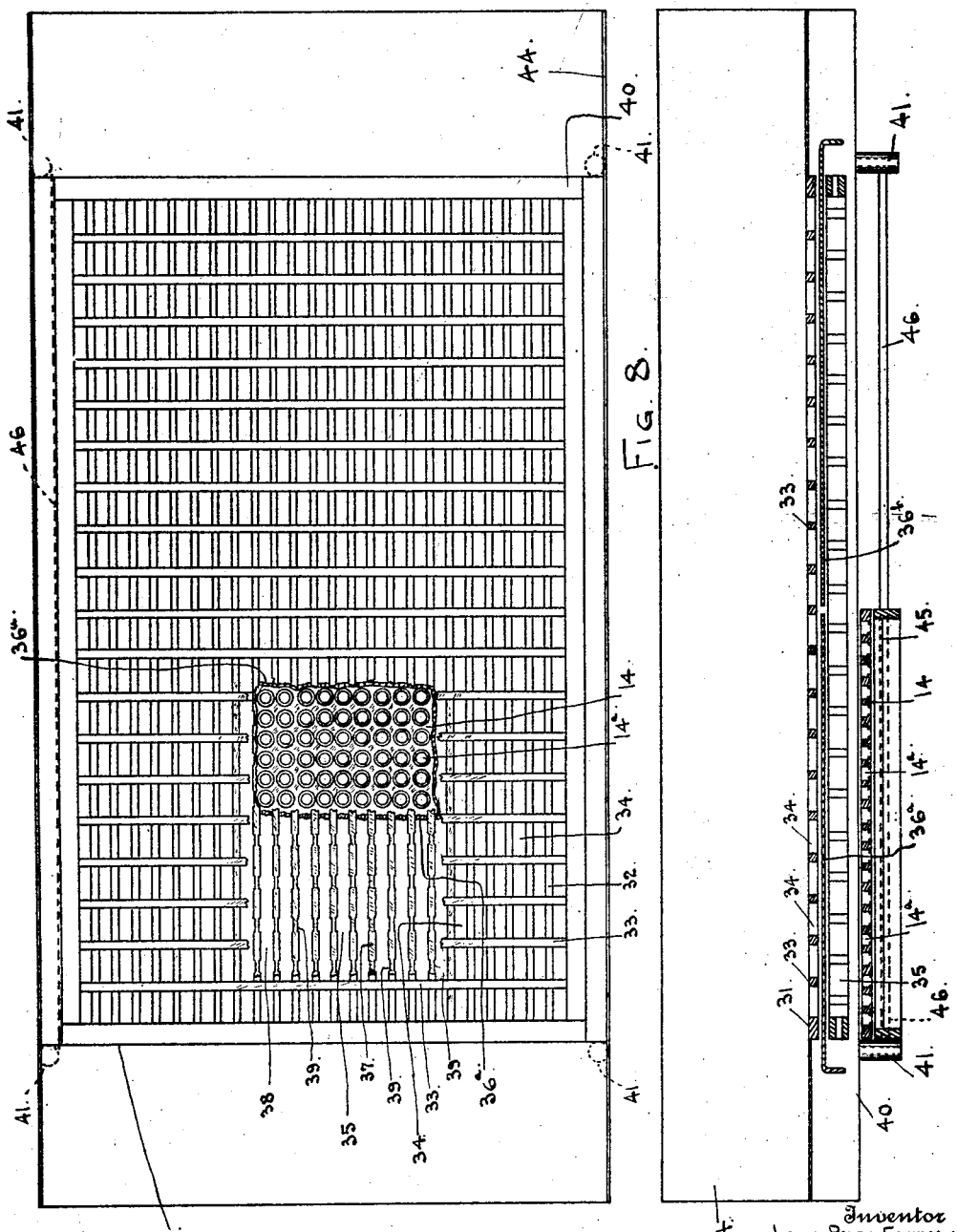

Dec. 29, 1925.
L. R. EASTMAN
1,567,639
CAPSULE FILLING MACHINE
Filed July 10, 1922 5 Sheets-Sheet 5
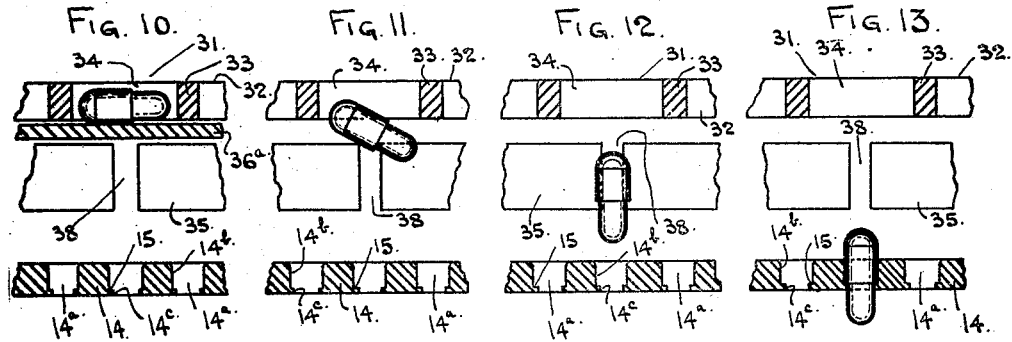
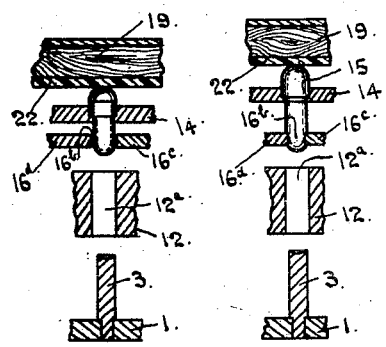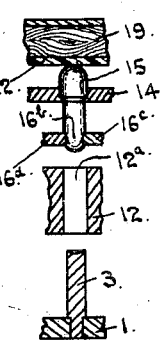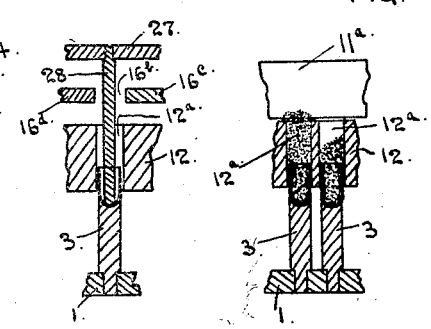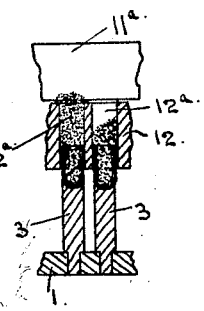
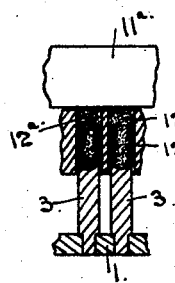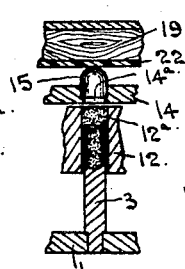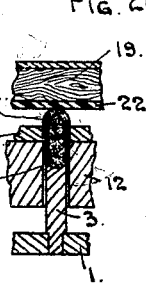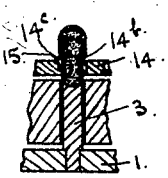
Inventor
LOUIS. RALPH. EASTMAN.

Patented Dec. 29, 1925.

1,567,639

UNITED STATES PATENT OFFICE.

LOUIS RALPH EASTMAN, OF HIGHLAND PARK, MICHIGAN.

CAPSULE-FILLING MACHINE.

Application filed July 10, 1922. Serial No. 573,986.

*To all whom it may concern:*

Be it known that I, LOUIS RALPH EASTMAN, a citizen of the United States of America, residing at Highland Park, in the county of Wayne and State of Michigan, have invented certain new and useful Improvements in Capsule-Filling Machines, of which the following is a specification, reference being had therein to the accompanying drawings.

The invention relates to machines for filling capsules and more particularly to a type which is adapted to divide the powder or other material into equal parts and to fill a plurality of capsules simultaneously. The object of the invention is to produce a machine which is adapted for quantity production of filled capsules without loss or breakage.

To this end I have provided a machine which performs a number of functions: first, loads the capsules into the machine; second, strips the caps from the bodies; third, simultaneously fills bodies with a predetermined amount of material, and fourth, replaces the caps compressing the filling material into both the body and the cap and ejects the filled capsules.

In the drawings:—

Figure 1:
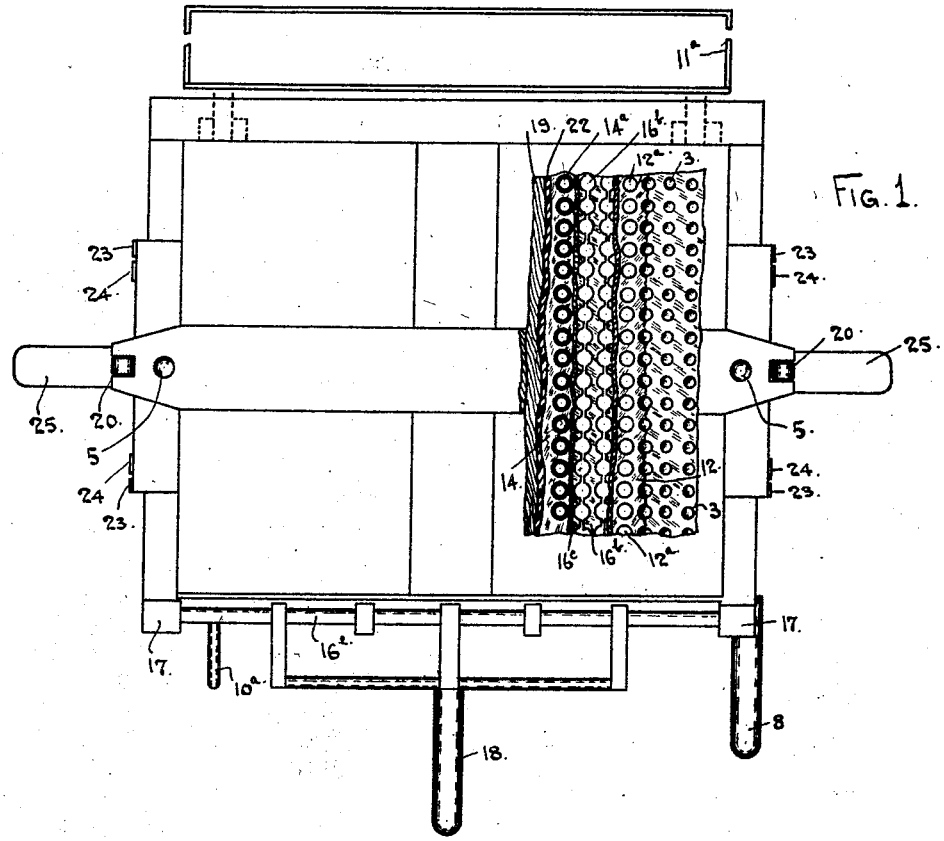
Figure 1 is a plan view of the machine which is broken away to show the various parts of the mechanism.
Figure 2:
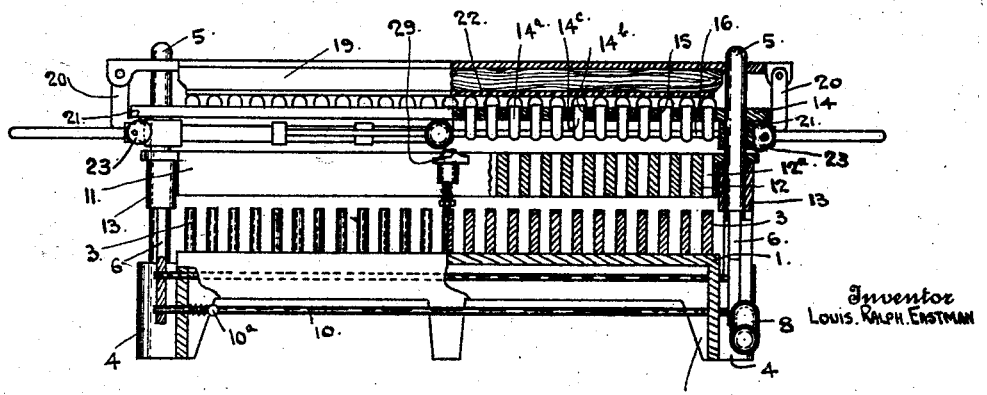
Figure 2 is a side view thereof partly in elevation and partly in section.
Figure 3:
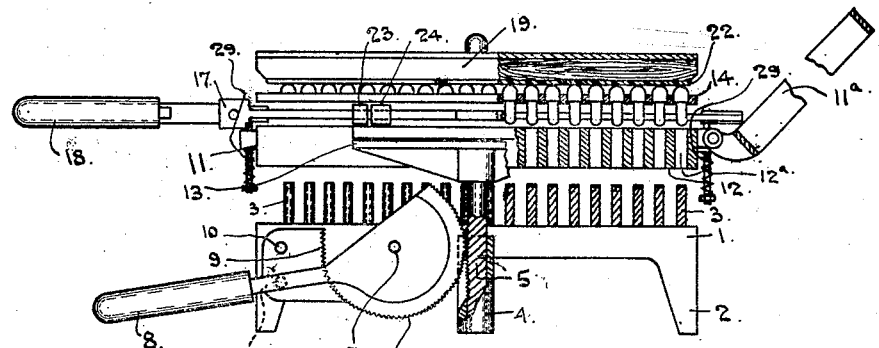
Figure 3 is an end view partly in section and partly in elevation.
Figure 4:
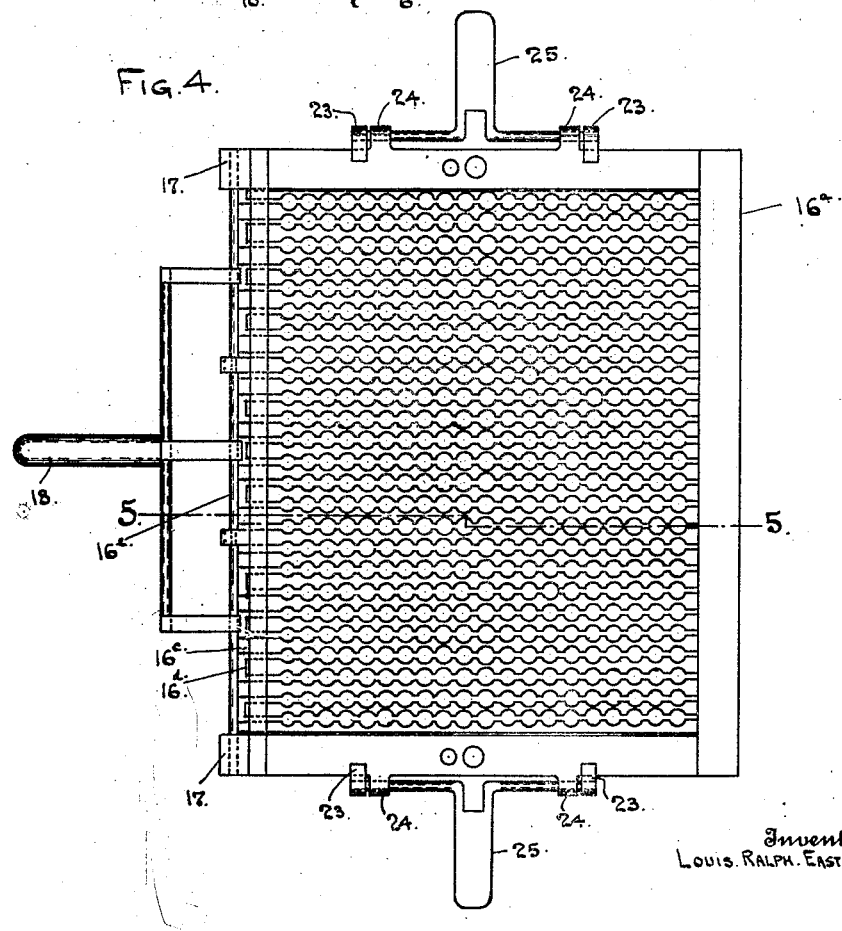
Figure 4 is a detail view of the gripping plate showing the cam for operating the same.

Figure 4ª is a similar view of a portion thereof showing the bars in adjusted position.

Figure 5 is a transverse section on the line 5—5 of Figure 4;

Figure 6 is a perspective view of the plunger set;

Figure 7 is a plan view partly broken away showing the apparatus for loading the capsules into the cap plate;

Figure 8 is a longitudinal section thereof;

Figure 9 is a transverse section thereof;

Figures 10 to 21 illustrate the position of the capsule during the various stages of the operation of a machine;

Figure 10 shows a capsule lying horizontally in the aligning plate;

In Figure 11 the sliding plate is removed and the capsule cap rests upon the shoulders of the loading plate;

In Figure 12 the capsule is turned to a vertical position;

Figure 13 illustrates capsules engaging the cap plate;

Figure 14 shows the first position of a capsule after placing the cap plate upon the main frame;

Figure 15, capsule body held and cap plate lifted;

Figure 16, cap removed and body pushed down on pin by plungers;

Figure 17, frame placed on trough and powder distributed unequally;

Figure 18, powder accurately divided;

Figure 19, cap plate replaced on trough;

Figure 20, powder compressed into capsule;

Figure 21, filled capsule ejected from machine;

Figure 22 is an end view of a capsule filling machine with the frame 11ª in position ready for filling the capsules.

Referring to that portion of the apparatus for dividing the powder and filling the capsules 1 is a base resting upon the legs 2 and provided with a series of rows of vertical pins or plungers 3 having concave upper ends adapted to fit the rounded ends of the capsule bodies. The base has offset enlargements 4 at its opposite ends in which the vertical posts 5 are slidably mounted. The posts are provided with rack teeth which respectively engage with the gears 6 secured at the opposite ends of a shaft 7 which is journaled upon the lower side of the base. A handle 8 secured to one of the gears provides the means for raising and lowering the posts which may be locked in their various positions of adjustment by the segmental racks 9 which are adapted to engage with the respective gears by moving the longitudinally slidable rods 10 relative to the base through the medium of a handle 10ª.

The trough 11 comprises a block 12 provided with a series of rows of apertures 12ª therethrough registering with the pins 3 and of a diameter equal to the outer diameter of the capsule bodies. The frame 11ª forms side members for holding the powder upon the face of the block 12 and is hingedly connected to the same in order that it may be swung out of the way during the loading of the capsule bodies in the apertures 12ª. The trough rests upon supports 13 which are suitably secured to the posts 5 so that by raising or lowering the handle 8 the trough is moved relative to the base and the plungers 3 slide in the apertures 12ª.

For convenience in loading capsule bodies into the trough, a cap plate 14 is provided which slidably engages the posts 5 and contains a series of apertures 14ª which register with the apertures 12ª in the trough. The apertures of the plate each have two differently diametered portions, the upper one of which 14ᵇ is of a diameter to permit the capsule bodies to pass therethrough. The annular shoulders 15 connecting the two portions of different diameters form abutments for the ends of the caps.

In order to separate the caps from the bodies a capsule body gripper 16 is provided below the plate 14 and also slidably engages at its ends the posts 5. The capsule gripper comprises a rectangular frame holding a series of notched bars 16ª. The notches in adjacent bars register with each other to form apertures 16ᵇ slightly greater in diameter than the capsule bodies and these apertures register with the apertures 12ª in the trough. For the purpose of clamping the capsule bodies to remove the caps therefrom the adjacent bars are moved longitudinally relative to each other. This is accomplished by making the series of alternate bars 16ᶜ of greater length than the other series of bars 16ᵈ and by providing an offsetting cam 16ᵉ rotatably mounted in bearing 17 in the capsule holder frame to engage the projecting ends of the series of bars 16ᶜ. Upon rotation of the cam by a handle 18 secured thereto the bars 16ᶜ are moved longitudinally relative to the bars 16ᵈ thereby offsetting the notches in adjacent bars.

The capsules are loaded into the apertures in the cap plate 14 with the body ends extending downward and to secure the caps against the annular shoulders 15 a capping block 19 is provided which slidably engages the posts 5 and is clamped to the cap plate by the hook shaped clamps 20 which are pivoted on the capping block and engage the lateral extensions 21 of the cap plate. The capping block is preferably provided with a rubber facing 22 on the side which clamps against the caps in order to protect them during the operation of replacing the caps on the bodies. Since the bodies of the capsules extend through the apertures in the capsule gripper 16, the bars 16ᶜ may be longitudinally adjusted to firmly clamp the bodies.

In order to remove the caps from the bodies the capsule gripper is provided at its opposite ends with lifting cams 23 which are journaled in suitable bearings 24 and provided with an operating handle 25. The cams 23 bear against the under side of the extensions 21 of the cap plate and are so shaped that they will lift the cap plate a sufficient distance to remove the caps from the bodies when rotated by means of the handle 25. After separating the caps from the bodies the capping block and cap plate are removed as a unit from the posts 5 and the clamping pressure upon the capsule bodies exerted by the gripper bars 16ª is released allowing the capsule bodies to fall into the apertures 12ª of the trough. The capsule bodies are next forced downwardly in the trough into engagement with the pins 3 by means of a suitable plunger set 26. The plunger set consists of a base 27 provided with a series of rows of depending plungers 28 which correspond to the arrangement of the apertures in the trough. The plungers are smaller than the inside diameter of the capsule bodies and are preferably rounded at the ends to conform to the shape of the capsule bodies.

After all of the bodies are pressed down into engagement with the plungers 3 the plunger set 26 and the body gripper 16 are both removed and the capsules are then in condition to receive the powder or other material with which they are to be filled. The frame 11ª is placed in position over the block 12 and secured thereto by a suitable spring clip 29 which is secured to the block 12 and engages in an aperture 30 of the frame. A weighed amount of powder or other material with which it is desired to fill the capsules is distributed on the face of the trough and falls into the apertures possibly filling some and leaving others only partially filled. In order to distribute the powder evenly so that each capsule receives the same amount the trough is slightly lowered causing the plungers 3 upon the base to force the capsule bodies upward in the trough thereby displacing some of the powder from the previously filled holes which can then be distributed to the partially filled holes. This adjustment can be continued until the powder is distributed uniformly in all of the holes and no more remains on the face of the trough.

The frame 11ª is then removed and the capping block 19 and cap plate 12 are replaced but now rest directly upon the block 12 and are secured thereto by the same spring clips 29 which previously secured the frame to the trough. The caps which were previously removed from the bodies are still between the cap plate and the capping block and are, therefore, in alignment with the respective bodies from which they were removed. The capping block, cap plate and trough may now be lowered together by means of the handle 10ª which forces the plungers 3 through the apertures in the trough thereby pressing the caps in engagement with the bodies and compressing the powder into both the bodies and the caps. Upon the withdrawal of the capping block the completely filled capsules may be removed.

As above stated, the capsules must be loaded into the cap plate with the body ends extending downward and I have, therefore, provided a loading device which will quickly arrange the capsules in this manner. In my preferred construction, as shown in Figures 7 and 8, this device consists essentially of an aligning plate 31 which has a series of parallel bars 32 extending longitudinally thereof and a series of transverse bars 33 which together form the series of rectangular shape apertures 34 having dimensions slightly greater than the length and diameter of the capsules. A loading plate 35 is arranged beneath the aligning plate and a sliding plate 36$^a$ separates the one from the other. The loading plate 35 is composed of a series of longitudinally extending parallel bars 37 which form spaces 38, the width of which is slightly greater than the diameter of the body of the capsule and slightly less than the diameter of its cap. The bars 37 are provided with the transversely aligned notches 39 in the sides thereof at regular intervals from one end to the other the distance between center lines of the notches corresponding to the distance between center lines of the transverse bars 33 in the aligning plate 31. The cap plate 14 is arranged below the loading plate with the apertures 14$^a$ registering with the notches 39.

When the capsules are placed on the aligning plate they fall into the apertures 34 and rest upon the sliding plate 36$^a$, as shown in Figure 9. As the sliding plate is now removed the capsule falls onto the loading plate 35 and the cap ends being larger than the spaces between the bars of the loading plate are arrested in their fall while the body ends continue to fall and cause the capsules to turn body end downward and slide through the notches 39 into the apertures 14$^a$ of the cap plate 14, as shown in Figures 11 to 13.

Since the length of the capsule is usually greater than the diameter thereof only the alternate series of apertures in the cap plate are in registration with the notches 39 in the loading plate and in order to completely fill the cap plate with capsules it is preferably arranged to slide beneath the aligning plate. In one position of adjustment the alternate apertures are filled with capsules while in the opposite position the remainder of the apertures are filled. In my preferred construction for loading capsules in this manner the loading plate 35 is arranged on a frame 40 having the legs 41 at the corners thereof and inwardly extending flanges 42 on which the loading plate 35 is supported. A bar 46 extends longitudinally of the frame between two of the legs 41. The frame is also provided with longitudinal grooves 43 in which the plate 36 is slidably arranged. This plate is preferably composed of two sections 36$^a$ and 36$^b$ which may be withdrawn from the frame independently of each other. The aligning plate 31 is secured to the frame 40 and a capsule retaining box 44 is placed thereon for convenience in distributing the capsules into the rectangular apertures 34.

The cap plate 14 is supported upon a separate frame 45 which is slidably arranged underneath the frame 40. In the operation of the loading device the frame 45 is placed against the legs 41 and also against the bar 46 at one end of the frame 40 which registers the alternate apertures of the cap plate with the rectangular apertures in the aligning plate. The capsules having been placed in the rectangular apertures of the aligning plate, the sliding plate 36$^a$ is removed which allows capsules to fall into the cap plate and fill the alternate apertures. The frame 45 is then slid to the opposite end of the frame 40 and the unfilled apertures of the cap plate are aligned with the rectangular apertures at the opposite ends of the aligning plate. By removing the sliding plate 36$^b$ the rest of the apertures in the cap plate will be loaded with capsules.

In this manner the cap plate is quickly and easily loaded and may be thereafter placed upon the main frame of the capsule filling machine and filled with powder as previously described.

What I claim as my invention is:—

1. In an apparatus of the character described, a member for clamping capsules comprising a pair of bars having cooperating recesses in their adjacent edges adapted in one position to receive the capsules, said bars being relatively longitudinally movable in the same plane to grip the capsules.

2. In an apparatus of the character described, a member for clamping capsules comprising a frame, a series of parallel bars relatively longitudinally movable in said frame having cooperating recesses in their adjacent edges for receiving capsules and means upon said frame for moving the alternate bars to offset said cooperating recesses to grip the capsules.

3. In an apparatus of the character described, a frame, a series of parallel bars in said frame having cooperating recesses in their adjacent edges to receive the capsules, the alternate bars being slidable in said frame relative to the other bars, a cam shaft journaled in said frame, the cam portions engaging the ends of said slidable bars, and means for rotating said cam shaft to offset said cooperating recesses in adjacent bars.

4. In an apparatus of the character described, the combination of a trough comprising a block having a series of rows of apertures therein for receiving capsule bodies, and a frame hingedly connected to said block to form the sides of the trough, means for limiting the movement of the capsule bodies in one direction relative to said block, said means permitting the open ends of the capsule bodies to be below the upper surface of said block, and means for moving said block relative to said limiting means.

5. In an apparatus of the character described, the combination with a block having a plurality of apertures therein for receiving capsule bodies and the material to be introduced thereinto, a series of plungers registering with said apertures, and means for moving said block relative to said plungers, of a gripping plate adapted to hold a plurality of capsule bodies, means for registering said bodies with said apertures, and means for releasing said bodies while in registration to transfer the same to said block.

6. In an apparatus of the character described, the combination with a block having a plurality of apertures therein for receiving capsule bodies and the material to be introduced thereinto, a series of plungers registering with said apertures and means for moving said block relative to said plungers, of a gripping plate adapted to hold a plurality of capsule bodies, means for registering said bodies with said apertures, means for releasing said capsule bodies from said gripping plate, and means for forcing said capsules into said block until the closed ends thereof engage said plungers.

7. In an apparatus of the character described, the combination with a block having a plurality of apertures therein for receiving capsule bodies and the material to be filled thereinto, of a cap plate adapted to hold a plurality of caps in registration with said apertures, means for securing said cap plate to said block, plungers insertable in the opposite ends of said apertures, and means for moving said block and cap plate relative to said plungers whereby the material in said apertures above said capsule bodies is forced into said caps.

8. In an apparatus of the character described, the combination with a block having a plurality of apertures for receiving capsule bodies, a series of plungers registering with said apertures, and means for moving said block relative to said plungers, of guide posts extending upwardly from said block, a series of devices slidably mounted on said guide posts, including a body gripping plate, a cap plate, and a capping block, means for securing said capping block to said cap plate, and means for securing said cap plate to said block when said body gripping plate is removed.

9. In an apparatus of the character described, the combination of a block having apertures therein for receiving capsule bodies, guide posts on said block, a member slidable upon said posts adapted to engage the cap portions of the capsules and allow the bodies thereof to extend therethrough, a second member also slidable upon said posts adapted to receive the body portions of said capsules, means upon said second member for gripping said body portions, and means for separating said members to remove the caps from the bodies.

10. In an apparatus of the character described, the combination with a cap plate having apertures therein for receiving capsules vertically, of an aligning plate having apertures for receiving capsules horizontally, and a loading plate provided with shoulders for engaging the caps to prevent the same from passing therethrough horizontally provided also with apertures permitting the capsules to pass through vertically.

11. In an apparatus of the character described, the combination of an aligning plate having a series of elongated apertures therethrough for receiving capsules, a cap plate below said aligning plate having a series of apertures for receiving capsules vertically, and a loading plate between said aligning plate and said cap plate having a passage therethrough for the capsules, of a width greater than the diameter of the capsules bodies and less than the diameter of the caps, said loading plate being provided also with a series of enlargements allowing the capsules to pass therethrough vertically.

12. In an apparatus of the character described, the combination of an aligning plate having a series of elongated apertures therethrough for receiving capsules horizontally, a cap plate below said aligning plate having a series of apertures therethrough for receiving capsules vertically, and a loading plate intermediate said plates comprising a series of parallel bars spaced apart a distance greater than the diameter of the capsule bodies and less than the diameter of the caps, said bars being provided with a series of notches in the adjacent edges thereof to allow the capsules to pass therethrough vertically.

13. In an apparatus of the character described, the combination with a capsule filling device comprising a block having apertures therein for receiving capsule bodies, relatively movable plungers extending within said apertures permitting the top of said capsule bodies to lie below the surface of said block whereby filling material may be placed in said apertures above said capsule bodies, of a cap plate removably secured to said block having apertures therein with portions enlarged to receive the caps and form shoulders for supporting the same, a retaining plate secured to said cap plate, and means for moving said block, cap plate and retaining plate as a unit relative to said plungers.

14. In an apparatus of the character described, the combination with a block having apertures therein for receiving capsule bodies, of a plate adapted to be superposed upon said block, said plate having a plurality of apertures therein for receiving capsule bodies, means on said plate for gripping said capsule bodies, and means for transferring said capsules from said gripping plate to said block.

15. In an apparatus of the character described, the combination of an aligning plate having a plurality of apertures therein, each adapted to receive a horizontally disposed capsule, a cap plate having a plurality of apertures adapted to receive vertically disposed capsules, and a loading device between said plates adapted to tilt said capsules from horizontal to vertical position with the cap end upwards.

In testimony whereof I affix my signature.

LOUIS RALPH EASTMAN.